June 30, 1953 — L. D. GOODWIN — 2,643,467
DEVICE FOR TEACHING ARITHMETIC
Filed Aug. 31, 1951 — 2 Sheets-Sheet 1
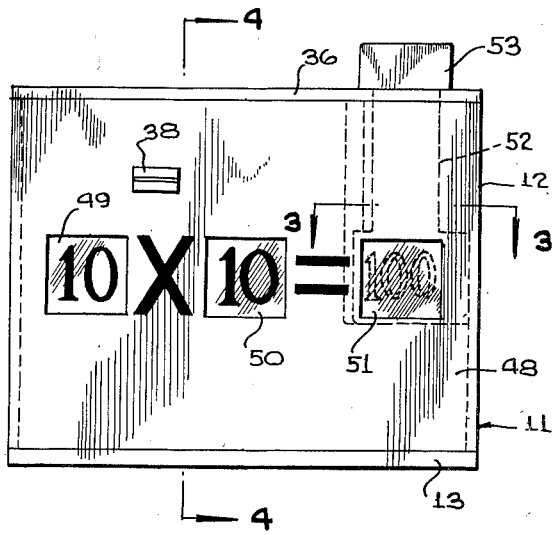
Fig. 1
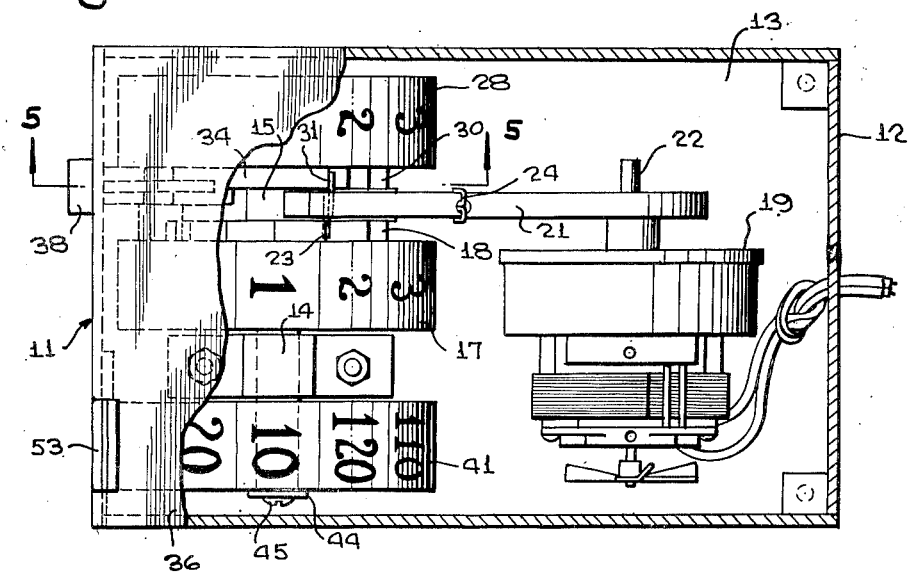
Fig. 2
Fig. 3
INVENTOR
LEWIS D. GOODWIN
BY
McMorrow, Berman & Davidson
ATTORNEYS June 30, 1953  L. D. GOODWIN  2,643,467
DEVICE FOR TEACHING ARITHMETIC
Filed Aug. 31, 1951  2 Sheets-Sheet 2
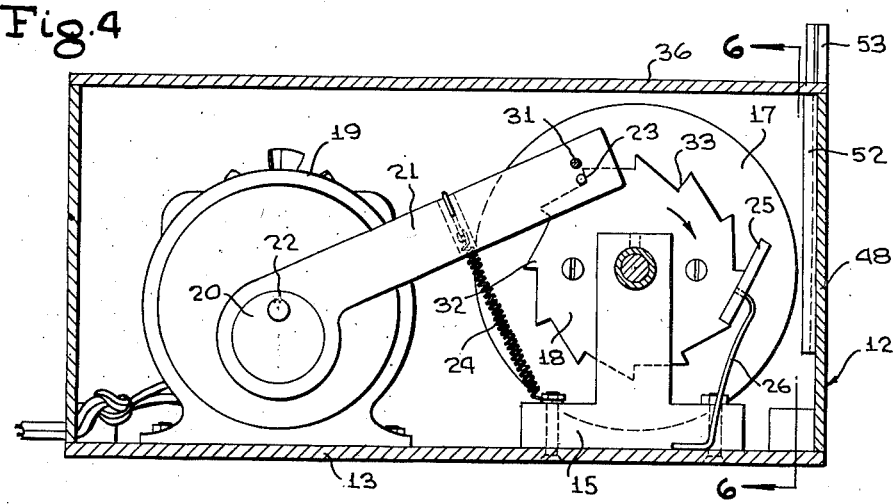
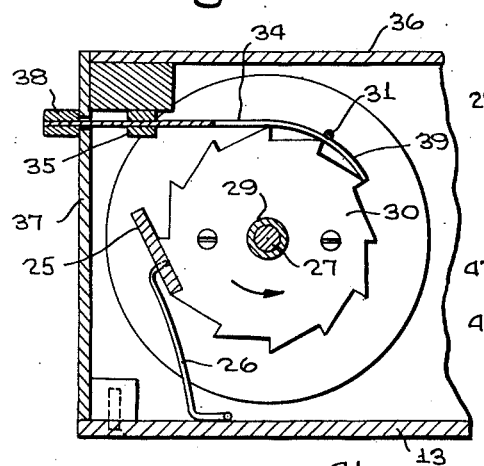
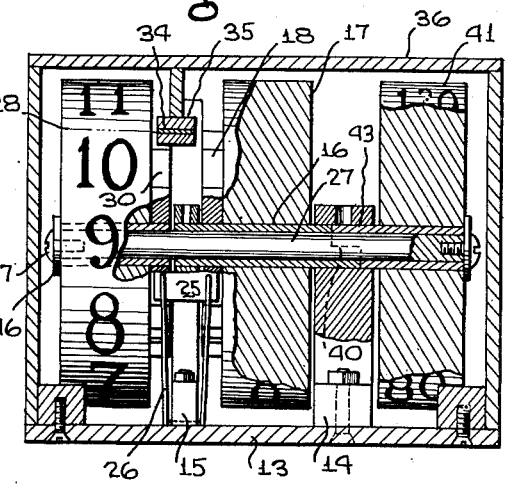
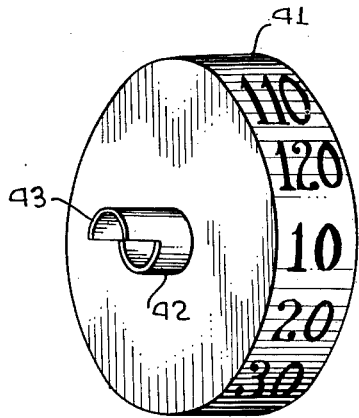
INVENTOR
LEWIS D. GOODWIN
BY McMorrow, Berman + Davidson
ATTORNEYS Patented June 30, 1953

2,643,467

UNITED STATES PATENT OFFICE 2,643,467

DEVICE FOR TEACHING ARITHMETIC

Lewis D. Goodwin, North Tonawanda, N. Y.

Application August 31, 1951, Serial No. 244,561

2 Claims. (Cl. 35—31)

This invention relates to educational toys, and more particularly to a novel and improved device for teaching multiplication.

A main object of the invention is to provide a novel and improved mechanical device for teaching multiplication, the device being simple in construction, being easy to operate, and being very compact in size.

A further object of the invention is to provide an improved mechanical toy adapted to be employed as an educational aid in teaching multiplication and similar mathematical operations, the toy being inexpensive to manufacture, being rugged in construction, being simple to manipulate, and being neat in appearance.

Further objects and advantages of the invention will become apparent from the following description and claims, and from the accompanying drawings, wherein:

Figure 1 is a front elevational view of an improved educational toy constructed in accordance with the present invention;

Figure 2 is a top plan view, partly broken away, of the improved toy of Figure 1;

Figure 3 is an enlarged cross-sectional detail view taken on the line 3—3 of Figure 1;

Figure 4 is a longitudinal, vertical, cross-sectional view taken on the line 4—4 of Figure 1;

Figure 5 is a cross-sectional detail view taken on the line 5—5 of Figure 2;

Figure 6 is a vertical cross-sectional view taken on the line 6—6 of Figure 4, portions of the elements being shown broken away;

Figure 7 is a perspective view of an answer wheel which may be employed with the educational toy device of Figures 1 to 6.

Referring to the drawings, the education toy device is designated generally at 11 and comprises a rectangular housing 12 having a base 13. Mounted on the base 13 are longitudinally aligned, transversely extending bearing brackets 14 and 15 in the top portions of which is journaled a longitudinally extending, horizontal sleeve 16. Secured to said sleeve between the bearing brackets 14 and 15 is the multiplier wheel 17. The wheel 17 has inscribed on its periphery regularly spaced numerals from 1 to 12, employed as multipliers in the multiplication table.

Integrally formed with the multiplier wheel 17 is the ratchet wheel 18 which is disposed adjacent to the bearing bracket 15, as shown in Figure 6. Mounted on the base 13 is an electric motor 19 having secured to its shaft the eccentric disc 20. Designated at 21 is a pawl arm which is rotatably mounted on the eccentric disc 20 so as to be reciprocated thereby responsive to rotation of the motor shaft, shown at 22. It will be readily apparent that since the eccentric disc 20 is rigidly secured to the motor shaft 22, rotation of the motor shaft causes the pawl arm 21 to be reciprocated back and forth in view of the rotatable connection of the end of the pawl arm on the eccentric 20. The free end of the pawl arm 21 has secured thereto a laterally projecting pin element 23 which is engageable with the ratchet teeth on the ratchet wheel 18, as shown in Figure 4, the pawl arm being biased into engagement with wheel 18 by the provision of a coil spring 24 connecting the intermediate portion of arm 21 to the base of the bearing bracket 15, whereby the pawl arm 21 is biased downwardly. The reciprocation of the pawl arm 21, therefore, rotates the ratchet wheel 18 clockwise, as viewed in Figure 4, responsive to the clockwise rotation of the motor shaft 22. Designated at 25 is a block member resiliently mounted on a spring arm 26 secured to base 13, the spring arm 26 urging the block member 25 against the periphery of the ratchet wheel 18 and causing the block member 25 to interlock with the ratchet teeth to prevent counterclockwise rotation of the ratchet wheel 18, as viewed in Figure 4, but to allow clockwise rotation thereof.

Designated at 27 is a longitudinally extending shaft member which is rotatably received in the sleeve 16 and projects on opposite ends thereof, as shown in Figure 6. Rotatably mounted on the shaft 27 at one end thereof is the multiplicand wheel 28, said wheel being secured on a sleeve member 29 providing a bearing therefor on the shaft 27. The multiplicand wheel 28 has inscribed on its periphery the regularly spaced numerals from 1 to 12 of the multiplication table. Rigidly secured to the multiplicand wheel 28 is a ratchet disc 30 disposed parallel to and opposing the ratchet disc 18, the pawl arm 21 being located immediately between the ratchet discs 18 and 30, as shown in Figure 2. The pawl arm 21 has secured thereto a laterally projecting pin element 31 spaced above the pin element 23, as shown in Figure 4, and which is adapted to engage the periphery of the ratchet disc 30 once for every complete rotation of the ratchet wheel 18, as will be presently described. As shown in Figure 4, the ratchet wheel 18 is formed at its periphery with the ratchet teeth 32, defined by notches therebetween. One of the notches, designated at 33, is made substantially deeper than the other notches on the periphery of the ratchet wheel, whereby the pawl arm 21 is allowed to descend a much larger distance when it engages in the notch 33 than when it engages in the other notches on the periphery of the ratchet wheel 18. When the pin element 23 enters the deeper notch 23, the pawl arm 21 is moved downwardly by the biasing action of the spring 24 a sufficient distance to allow the pin element 31 to engage the toothed periphery of the ratchet wheel 30, allowing the pawl arm 21 to advance the ratchet wheel 30 one step simultaneously with the advancement of the ratchet wheel 18 one step, as the pin element 23 drives the tooth adjacent the notch 33 in a clockwise direction. During the remaining portions of the cycle of rotation of the ratchet wheel 18 the pin element 31 is held out of engagement with the ratchet wheel 30 and the multiplicand wheel 28 is consequently stationary during the entire portion of the cycle of revolution of the multiplier wheel 17 except for the step during which the pin element engages in the notch 33.

Engagement of the pin element 31 with the periphery of the ratchet wheel 30 may be prevented by the provision of a slidable cam bar 34, arranged as shown in Figure 5. The bar 34 is slidably supported in a depending bracket 35 secured to the top wall 36 of housing 12, the forward end of the bar 34 projecting outwardly through the front wall 37 of housing 12, and having secured thereon a handle 38 for manually reciprocating the bar 34. The inner end of the bar is formed with the downwardly curved cam portion 39 underlying the pin 31 on pawl arm 21, whereby the pawl arm may be lifted slightly when the bar 34 is pushed inwardly. The lifting of the pawl arm 21 by the cam bar 34 is insufficient to prevent complete disengagement of the pin 23 from the periphery of the ratchet wheel 18, whereby the reciprocation of the pawl arm 21 continues to drive the ratchet wheel 18 and the multiplier wheel 17 in a clockwise direction, as viewed in Figure 4, while preventing the pin 31 from engaging the periphery of the ratchet wheel 30. When the cam bar 34 is pulled outwardly, namely, to the left from the position shown in Figure 5, the curved cam portion 39 disengages from the pin 31 and allows said pin 31 to engage the toothed periphery of the ratchet wheel 30 when the pin 23 enters the deeper notch 33 of ratchet disc 18.

As shown in Figure 5, the plate member 25 engages the toothed periphery of the ratchet disc 30 as well as the periphery of ratchet disc 18, preventing clockwise rotation of disc 30, as viewed in Figure 5, but allowing counterclockwise rotation thereof, namely, allowing the ratchet disc 30 to rotate in the same direction as the ratchet disc 18.

The end of sleeve 16 is halved, as shown at 40, said halved portion being received in the bearing bracket 14. Designated at 41 is the answer wheel which is secured to a sleeve 42 rotatably mounted on the shaft 27, the sleeve 42 being halved at its inner end, as shown at 43, to interlock with the halved portion 40 of the sleeve 16 and to define a driving coupling therewith, whereby the answer wheel 41 is driven simultaneously with the multiplier wheel 17. As shown in Figure 6, the answer wheel 41 is detachably secured to the shaft 27 by the provision of a washer 44 and machine screw 45 threadably engaged in the end of the shaft 27 and restraining the sleeve element 42 against endwise movement outwardly on the shaft 27. At the opposite end of the shaft a similar washer 46 is provided, and a machine screw 47 threadedly engaged in the end of the shaft 27 and restraining the sleeve elements 29 against endwise outward movement on the shaft 27.

The answer wheel 41 is inscribed on its periphery with the numerals corresponding to the answers obtained by the multiplication of the respective numbers on the multiplicand wheel 28 with the successive numbers on the multiplier wheel 17.

The front wall of the housing 12, designated at 48, is formed with respective windows 49, 50 and 51, displaying the respective numbers on the peripheries of the wheels 28, 17 and 41. Designated at 52 is a vertically slidable mask bar extending slidably through and frictionally engaging in a slot provided in the top wall 36 of the housing 12 immediately above the window 51. The top end of the mask bar 52 comprises the external handle 53 whereby the bar 52 may be raised or lowered manually. The mask bar 52 is arranged so that it may be lowered to a position covering the window 51 and preventing observation of the periphery of wheel 41, and alternatively may be elevated to a position wherein the periphery of wheel 41 is clearly visible through the window 51.

A number of answer wheels 41 are provided, said answer wheels being readily mounted on the shaft 27 and being selected in accordance with a selected multiplicand numeral on the disc 28. The housing 12 is made so that it may be readily detached from the base 13 to allow access to the machanism for changing the answer wheel 41.

In using the device, the cam bar 34 is pulled outwardly, whereby the multiplicand wheel 28 is caused to rotate through one step for each complete revolution of the multiplier wheel 17 and the answer wheel 41. The multiplicand wheel 28 is thus allowed to be advanced step by step until the proper numeral on the periphery of the multiplicand wheel 28 appears in the window 49 to correspond with the number values given on the periphery of the answer wheel 41. The cam bar 34 is then pushed inwardly by means of the handle 38, causing the curved portion 39 to engage the pin element 31, as above described, whereby the multiplicand wheel 28 is held stationary, while the multiplier wheel 17 and the answer wheel 41 rotate. Under these conditions, the answer appearing in the window 51 will correspond to the product of the numeral shown through the window 49 and the numeral shown through the window 50. The answer may be hidden by lowering the mask member 52 to a position wherein the window 51 is obscured, whereby the child employing the device may guess or attempt to give the correct answer, which then may be verified by elevating the mask member 52 to a position rendering the answer visible through the window 51. Thus, a child is enabled to practice multiplication of the different multiplier numerals with a particular multiplicand numeral selected from the wheel 28. When it is desired to employ a different multiplicand number on the wheel 28, a different answer wheel 41, corresponding thereto, may be substituted in the device in place of the previous answer wheel, and the process may be repeated with the new multiplicand numeral selected.

When it is desired to energize the motor 19, to cause the pawl arm 21 to be reciprocated, the line cord of the motor may be plugged into a suitable power receptacle. The motor 19 will then be operated continuously until it is desired to discontinue reciprocation of the pawl arm 21, at which time the line cord is disconnected from the power receptacle. Alternatively, the line cord may be provided with a conventional control switch.

Motor 19 is energized whenever it is desired to change the multiplier numeral exhibited in window 50, or whenever it is desired to change the multiplicand numeral exhibited in window 49, in the manner above described, namely, by pulling the cam bar 34 outwardly.

Since there are twelve notches in the periphery of ratchet wheel 18, multiplier wheel 17 rotates at one-twelfth the speed of the motor shaft 22 when the motor is energized.

After the desired answer wheel 41 has been installed, the motor 19 is energized and the cam bar 34 is pulled outwardly and maintained in its outwardly pulled position until the proper multiplicand number appears in the window 49. Thus, the device may be employed to practice division, since the number appearing in the window 49 must be the proper factor, which when multiplied by the numbers on the multiplier wheel 17, gives the answer numbers appearing in window 51.

In practicing multiplication, as above explained, the mask member 52 may be lowered to obscure window 51, whereby the child using the device may attempt to mentally calculate the correct answer corresponding to the product of the selected numbers appearing in windows 49 and 50, which may be then verified by elevating mask member 52. This procedure may be followed for the different combinations of the positions of the wheels 28 and 17. Thus, the mask member 52 may be lowered prior to which energization of motor 19 and raised after the motor has been deenergized and the mental calculation made.

Obviously, the same apparatus may be employed for teaching division by providing suitable answer wheels therefor While a specific embodiment of an improved mechanical educational device for teaching arithmetical processes has been disclosed in the foregoing description, it will be understood that various modifications within the spirit of the invention may occur to those skilled in the art. Therefore, it is intended that no limitations be placed in the invention except as defined by the scope of the appended claims.

What is claimed is:

1. An educational toy for teaching arithmetic comprising a support, a pair of spaced coaxial wheels rotatably mounted on said support, means coupling said wheels for simultaneous rotation, a ratchet disc rigidly connected to said wheels, a rotary driving member mounted on said support, a pawl eccentrically connected to said driving member and drivingly engaging said ratchet disc, a third wheel rotatably mounted on said support coaxially with said pair of wheels, a ratchet disc secured to said third wheel, means on said pawl drivingly engageable with said last-named ratchet disc, the periphery of said first-named ratchet disc being formed with spaced notches, all but one of said notches being relatively shallow and preventing engagement of said pawl with the last-named ratchet disc, said pawl being engageable with the last-named ratchet disc only when the pawl engages in the deeper notch of the first-named ratchet disc, whereby the last-named ratchet disc is rotated through a single step of actuation thereof for each complete revolution of the first-mentioned pair of wheels, spaced numerical indicia on the peripheries of the respective wheels, said indicia being angularly spaced by distances corresponding to said single step of actuation, and a manually movable abutment element carried by said support and arranged to be moved at times to a position engaging the pawl and preventing the pawl from fully entering said deeper notch, thereby preventing actuation of said third wheel.

2. An educational toy for teaching arithmetic comprising a support, a pair of spaced coaxial wheels rotatably mounted on said support, means coupling said wheels for simultaneous rotation, a ratchet disc rigidly connected to said wheels, a rotary driving member mounted on said support, a pawl eccentrically connected to said driving member and drivingly engaging said ratchet disc, a third wheel rotatably mounted on said support coaxially with said pair of wheels, a ratchet disc secured to said third wheel, means on said pawl drivingly engageable with said last-named ratchet disc, the periphery of said first-named ratchet disc being formed with spaced notches, all but one of said notches being relatively shallow and preventing engagement of said pawl with the last-named ratchet disc, said pawl being engageable with the last-named ratchet disc only when the pawl engages in the deeper notch of the first-named ratchet disc, whereby the last-named ratchet disc is rotated through a single step of actuation thereof for each complete revolution of the first-mentioned pair of wheels, spaced numerical indicia on the peripheries of the respective wheels, said indicia being angularly spaced by distances corresponding to said single step of actuation, a manually movable abutment element carried by said support and arranged to be moved at times to a position engaging the pawl and preventing the pawl from fully entering said deeper notch, thereby preventing actuation of said third wheel, and a shield member slidably carried by said support and arranged to be moved into shielding relation over the periphery of one of said pair of wheels.

LEWIS D. GOODWIN.

References Cited in the file of this patent

UNITED STATES PATENTS

| Number | Name | Date |
|--------|------|------|
| 214,822 | Hitchcock | Apr. 29, 1879 |
| 1,479,992 | Kinney | Jan. 8, 1924 |
| 2,114,501 | Oswald | Apr. 19, 1938 |
| 2,476,580 | Bergman | July 19, 1949 |